United States Patent
Jones

[15] 3,677,161
[45] July 18, 1972

[54] HIGH REDUCTION CAMERA AND LOCATING APPARATUS

[72] Inventor: Derrick A. Jones, Woodbury, Minn.
[73] Assignee: Minnesota Mining and Manufacturing Company, St. Paul, Minn.
[22] Filed: Feb. 16, 1970
[21] Appl. No.: 11,367

[52] U.S. Cl. .................................. 95/45, 92/49, 92/103, 355/44
[51] Int. Cl. .................................................. G03b 3/10
[58] Field of Search ................... 92/49, 103; 355/44; 95/45

[56] References Cited

UNITED STATES PATENTS

| | | | |
|---|---|---|---|
| 3,100,399 | 8/1963 | Robins | 92/49 X |
| 3,081,682 | 3/1963 | Khoury | 95/45 |
| 3,350,977 | 11/1967 | Gans | 95/45 X |
| 3,354,775 | 11/1967 | Erban | 95/45 X |
| 3,366,004 | 1/1968 | Czernek | 95/45 X |

Primary Examiner—Samuel S. Matthews
Assistant Examiner—Michael Harris
Attorney—Kinney, Alexander, Sell, Steldt & Delahunt

[57] ABSTRACT

Locating apparatus, utilized in combination with a high reduction imaging system including a photographic film holder, an image projector and wherein the locating apparatus includes two circular diaphragms for supporting a lens holder, and pressurized fluid means acting on the diaphragms to produce a differential force to deflect the diaphragms and precisely position the lens holder relative to a test sample of photographic film.

2 Claims, 3 Drawing Figures

Patented July 18, 1972

3,677,161

INVENTOR.
DERRICK A. JONES
BY Kinney, Alexander,
Sell, Steldt & DeLaHunt
ATTORNEYS

HIGH REDUCTION CAMERA AND LOCATING APPARATUS

BACKGROUND OF THE INVENTION

The photographic film utilized in microfilming or microphotography with high reduction cameras must be tested prior to use to ensure that the film has the necessary resolving quality. The established method of determining the resolving quality of a film requires that the imaging system impinge an image in excess of 1,600 line pairs/mm onto the film. To simplify the film evaluation procedure and to provide improved scientific analysis of the photographic film, the applicant developed a high reduction imaging system wherein an image could be focused with extreme precision on the photographic film. This precise focusing enabled the camera to be focused, at known increments, throughout the exceedingly narrow depth of field of the lens. Thus, by reducing the possibilities of the test camera itself causing the inadequate resolution on the photographic film, attention could then be concentrated on scientific analysis of the photographic film itself to produce the reason for inadequate resolution of the film.

One previous imaging system was described in an article by J. H. Altman and H. C. Schmitt, Jr. appearing in the publication of the two-day seminar proceedings on ultra-microminiaturization, copyrighted in 1968 by the Society of Photographic Scientists and Engineers, Inc. The camera system described therein utilized a pneumatic jet for indicating the location of an objective lens to adjust the exceedingly critical focusing of the camera, wherein, even the fine focus of a good-quality microscope did not provide adequate focusing control of the camera. Fundamentally, the problem has been to locate the objective lens with respect to the emulsion surface of the photographic film with a precision and sensitivity of the order of less than a micron. The above article described a pneumatic jet means of determining when the precision positioning of the objective lens at a predetermined location of better than 0.75 microns was accomplished. Such relatively precise location of the objective lens would not be accurate enough when using a lens having a theoretical resolution of 3,600 line pairs/mm. and a depth of field of 0.4 microns. In using such a pneumatic jet indicating apparatus with a lens having a depth of field of 0.4 microns, it would be necessary to make the final focus by photographic testing, trial and error, throughout a small range of focus settings. If an apparatus could be developed that would knowingly focus the objective lens within the depth of field of the particular lens, a depth of field of 0.4 microns in the above example, then it would be possible to eliminate erroneous focusing of the camera as one cause of inadequate resolution appearing on the test sample of the photographic film.

SUMMARY OF THE INVENTION

The present invention relates to a locating apparatus to provide extremely precise axial location of an instrument, such as an objective lens, by controlling the axial movement of an instrument holder by deflecting a first and second diaphragm suspending the instrument holder, by pressurized fluid means exerting a differential force through said first and second diaphragms in reaction to the spring reserve force of said diaphragms to accurately move and indicate the position of said instrument holder at a known axial location relative to a work piece, such as a photographic film when the locating apparatus is utilized in a high reduction imaging system for evaluating photographic film.

The locating apparatus of the present invention provides for extremely precise axial location of an instrument, within 0.1 microns (4 millionths of an inch). This apparatus also provides for repetitious locating of an instrument, within 0.1 microns, from a relatively remote position. The high reduction camera, developed to utilize the locating apparatus of the present invention, makes varied and precisely controlled exposures on a test sample of photographic film from a remote position to enable the camera to be operated in a lighted environment.

These and other advantages of the present invention will be readily apparent from consideration of the following specification relating to the annexed drawing in which.

Figure 1:
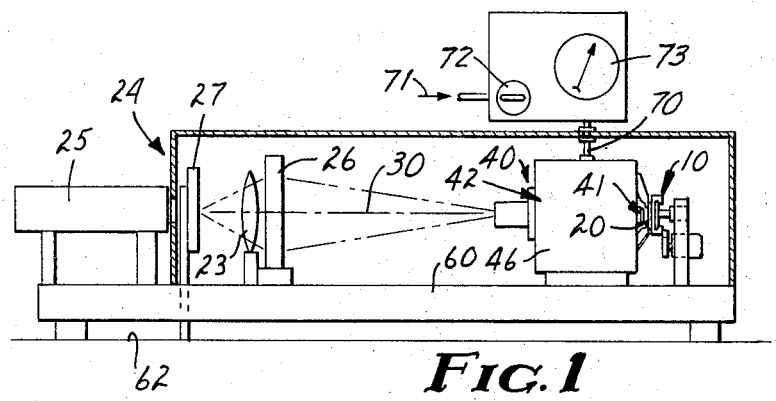
FIG. 1 is a diagrammatic side elevational view of the high reduction imaging system of the combined embodiment.

Referring now to the combined embodiment illustrated in FIG. 1 of the drawing, wherein like reference characters designate like or corresponding parts throughout the several views, there is shown in FIG. 1 a film holder 10 for supporting a test sample of photographic film 20, an image projector 24, including a lamp assembly 25, condensor lens 23 and a test target 26, for producing a test image and for projecting the test image along a longitudinal axis 30 of the high reduction imaging system, and a locating apparatus 40, or imaging focusing apparatus 40, to provide extremely precise focusing of the test image on the photographic film 20. The lamp assembly 25 is a standard 35 mm. slide projector including satisfactory condensor and projection lens (not shown). The resolution test target 26 is illustrated as a USAF 1951 resolution test target. The distance between the target 26 to optical elements contained within focusing apparatus 40 is adjusted to yield the desired reduction, preferably so that a reduction of 100, 200, or 400 is obtained on the film 20. The shutter 27 can be placed adjacent the condensor lens of the image projector 24, as shown in FIG. 1, or alternatively located near the entrance to the imaging focusing apparatus 40 where the optical path diameters are considerably smaller. The shutter 27 has been mounted on the work bench 62 rather than the optical bench 60 to prevent the actuation of the shutter 27 from vibrating the optical bench 60. As shown in FIG. 1, the optical bench 60 supports all os the system modules except the shutter 27. The optical bench 60 is vibration isolated (not shown) from the work bench 62 to prevent error producing vibrations from reaching the modules of the system. The shutter 27 is operated, in the disclosed combined embodiment, by a solenoid (not shown). Short exposure times are controlled by setting the shutter 27 to be mechanically held open for more than one second duration. Of course, this one second duration may be selectively altered depending on the characteristics of the photographic film.

Figure 2:
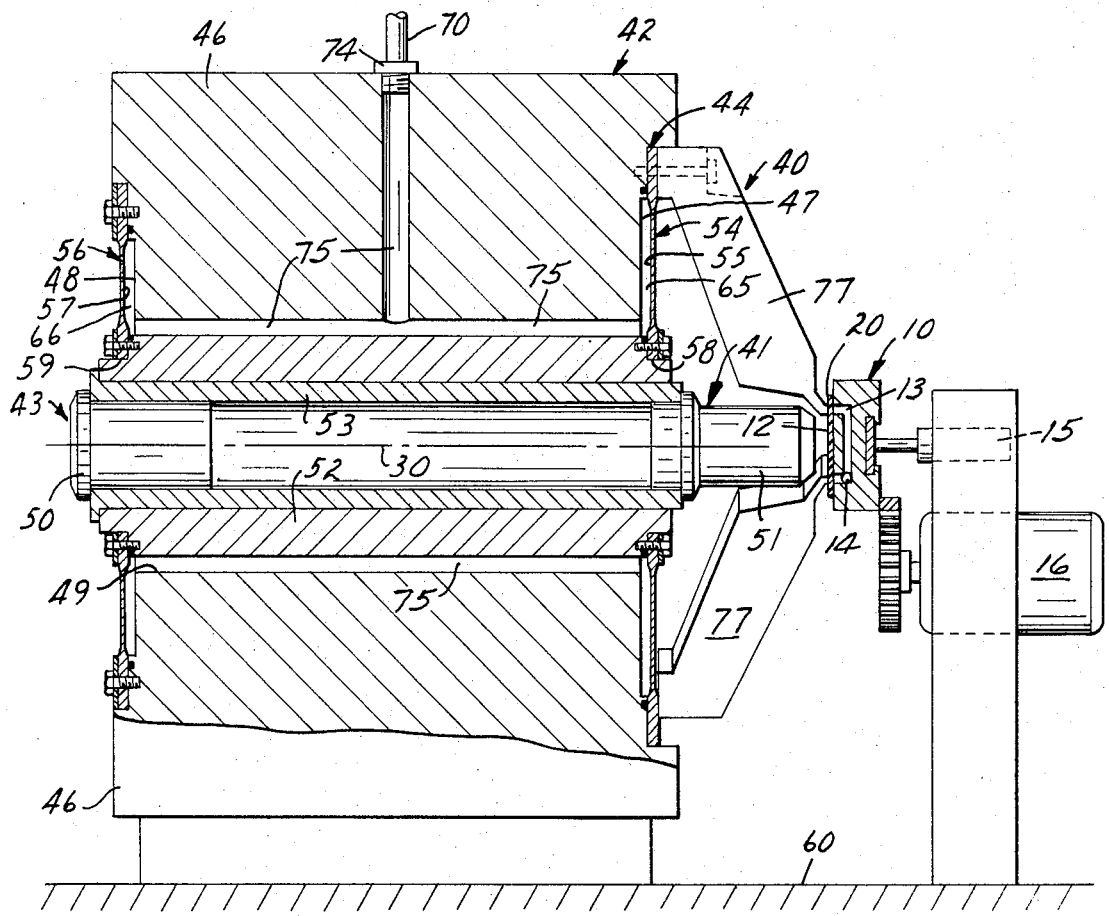
FIG. 2 is a sectional side view of the locating apparatus of the present embodiment.

The locating apparatus 40, which provides the extremely precise axial location of an instrument 41, from a position outside and remote to the locating apparatus 40, includes a support frame 42 to provide stationary support of a work piece, such as photographic film 20 as utilized in the combined embodiment, along the predetermined longitudinal axis 30, an instrument holder for supporting an instrument, such as an eyepiece 50 and objective lens 51 of the combined embodiment, at a known distance from the work piece. The locating apparatus 40 of the present invention has utility in many other combinations requiring precise location of an instrument, such as axial adjustment of a pair of mirrors which define the resonant cavity of a laser and such as machine tool application. The support frame 42, as illustrated in the combined embodiment, includes a housing 46, secured to optical bench 60, having outer first and second longitudinally spaced ends 47, 48, respectively, and a cylindrical aperture 49 extending between the ends 47, 48 for receiving the lens holder 52. A suspension means 44 is secured to the support frame 42 and secured to the instrument holder 43 to afford movement of the instrument holder 43 along the axis 30. The suspension means 44 includes a first deflectable beam having an inner first surface area and a second deflectable beam, spaced axially from the first beam, and having an inner second surface area smaller in surface area than the first area of the first beam. In the combined embodiment as shown in FIG. 2, the first beam is illustrated as a first substantially circular steel diaphragm 54 having a centrally located first aperture 58. The first diaphragm 54 is secured and sealed about its outer periphery to housing 46 and secured and sealed about its aperture 58 to the lens holder 52. The first diaphragm includes a first inner surface area 55 and defines a circular first pressure chamber 65 between the housing 46, lens holder 52 and first surface 55. The second beam is illustrated as a second substantially circular steel diaphragm 56 having a centrally located second aperture 59. The second diaphragm 56 is also secured and sealed about its outer periphery to housing 46 and secured and sealed about its aperture 59 to the lens holder 52. The second diaphragm includes a second inner surface area 57 and defines a circular second pressure chamber 66 between the housing 46, lens holder 52 and second surface 57. The first surface area 55 is larger than the second surface area. Pressurized fluid means 70, exerts an equal pressure on each inner surface area 55, 57 in opposite axial directions to produce a differential force, the result of equal pressure being applied over different surface areas, for deflecting the first and second diaphragms 54, 56 toward the first diaphragm 54 or toward the film 20 as the components are arranged in FIG. 2. The fluid means 70 includes a source 71 of pressurized fluid, a pressure regulator 72, pressure indicating gauge 73, flow lines 74 and fluid passageways 75 communicating between the first and second pressure chambers 65, 66. Thus, as pressurized fluid or air pressure is varied between 0–80 psi by the pressure regulator 72, the lens holder 52 is moved and precisely located (within 0.1 micron) by the differential force acting acting on the diaphragms 54, 56 to precisely focus the projected test image on the film 20. In one example illustrated by the present embodiment, the first inner surface area was defined between inner and outer diameters of 4 ¾ inch and 2 inches, the second inner surface area was defined between inner and outer diameters of 3 ⅝ inch and 2 inches. The first diaphragm 54 had a thickness of 0.060 inches and the second diaphragm 56 had a thickness of 0.058 inches. As the air pressure was varied between 0–80 psi, the lens holder moved, at a linear relationship, between 0–0.002 inches.

Figure 3:
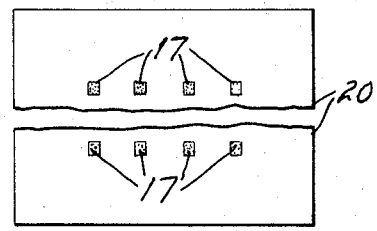
FIG. 3 illustrates an enlarged section of photographic film showing a plurality of images formed on the film.

The housing 46 includes three feet 77, located 120° apart, terminating in three small surface areas defining a precise locating plane on the housing 46 to receive the film 20. The film holder 10 includes a front face 12 having grooves 13 therein and vacuum passageways 14 connected to the grooves 13 for forming vacuum holding chambers as defined by the grooves 13 and the film 20 for securing the film 20 to the holder 10. Actuation means, including an air cylinder 15, moves the film holder toward and away from the housing 46 on a slide (not shown) to place the film 20 against the feet 77 and away from the feet 77 as the film 20 is advanced. Motor means 16, including a corresponding rack and pinion, advances the film 20 to successive positions to permit a plurality of images 17 to be placed on the film 20 as shown in FIG. 3.

What is claimed as the invention is:

1. A locating apparatus to provide extremely precise axial location of an instrument from an outside remote position, said apparatus comprising:
   1. a support frame to provide stationary support of a work piece along a predetermined axis, said support frame having an enlarged aperture extending therethrough and aligned with said axis;
   2. an instrument holder for supporting an instrument along said sxis, said instrument holder being positioned to extend through said aperture;
   3. means for suspending said instrument holder within said aperture for movement along said axis and return movement to a fixed position in relationship to a said workpiece, said means for suspending consisting of a pair of metallic diaphragms positioned one adjacent each of the opposite ends of said aperture and secured to said support frame and to said instrument holder with the axis of said diaphragms being aligned with said predetermined axis, one of said diaphragms of said pair having a greater area than the other of said diaphragms;
   4. passage means in said support frame for introducing known quantities of pressurized fluid into said aperture between said pair of diaphragms; and
   5. means for regulating pressure of a said fluid to be introduced into said passage means whereby a given pressure may be applied against said diaphragms affording differential force against the spring reserve force of said diaphragms to precisely locate said instrument holder along said axis relative to a said workpiece.

2. An apparatus according to claim 1 wherein said support frame includes a housing having spaced ends and in which is formed said aperture and said passage means, and a support at one end thereof for positioning a workpiece; said aperture being generally cylindrical and extending between said spaced ends and means defining a chamber adjacent said one end of said housing communicating with said aperture with the larger one of said diaphragms being positioned to form a portion of said chamber to afford movement of said instrument holder toward said support for a workpiece.

* * * * *